United States Patent [19]

German

[11] 4,029,035
[45] June 14, 1977

[54] SHIP'S HULL AND METHOD OF BUBBLING HOT GAS THEREFROM

[76] Inventor: William H. German, 20180 Lakeshore Rd., Baie d'Urfe, Quebec, Canada, H9X 1P7

[22] Filed: Apr. 13, 1976

[21] Appl. No.: 676,429

[52] U.S. Cl. .............................. 114/67 A; 114/40; 114/121
[51] Int. Cl.² ..................... B63B 1/38; B63B 35/08
[58] Field of Search ............. 114/40, 41, 67 A, 45, 114/121, 211

[56] References Cited

UNITED STATES PATENTS

| | | | |
|---|---|---|---|
| 2,550,823 | 5/1951 | King | 114/45 |
| 2,754,791 | 7/1956 | Nieding | 114/67 A |
| 3,580,204 | 5/1971 | Burmeister | 114/67 A |
| 3,665,886 | 5/1972 | German | 114/40 |
| 3,831,385 | 8/1974 | Hudson et al. | 114/40 |
| 3,837,311 | 9/1974 | Lea | 114/40 |
| 3,850,125 | 11/1974 | Anders | 114/40 |
| 3,934,529 | 1/1976 | Gallagher | 114/40 |

*Primary Examiner*—Trygve M. Blix
*Assistant Examiner*—Gregory W. O'Connor

[57] ABSTRACT

The invention relates to the generation of compressed gas for bubbling from a ship's hulls in ice-laden water in order to reduce the drag on the ship's movement produced by the ice, and also to help break up the ice. The compressed gas is generated by apparatus having an air compressor, a device for mixing fuel with the compressed air, a device for igniting the fuel/air mixture so that hot gas is generated under pressure, and at least one pipe which is provided for receiving the hot compressed gas and for supplying the gas to holes located in the hull of the ship below the waterline. The pressure of the gas is greater than the water pressure at the holes so that bubbling of the gas from the holes takes place.

13 Claims, 9 Drawing Figures

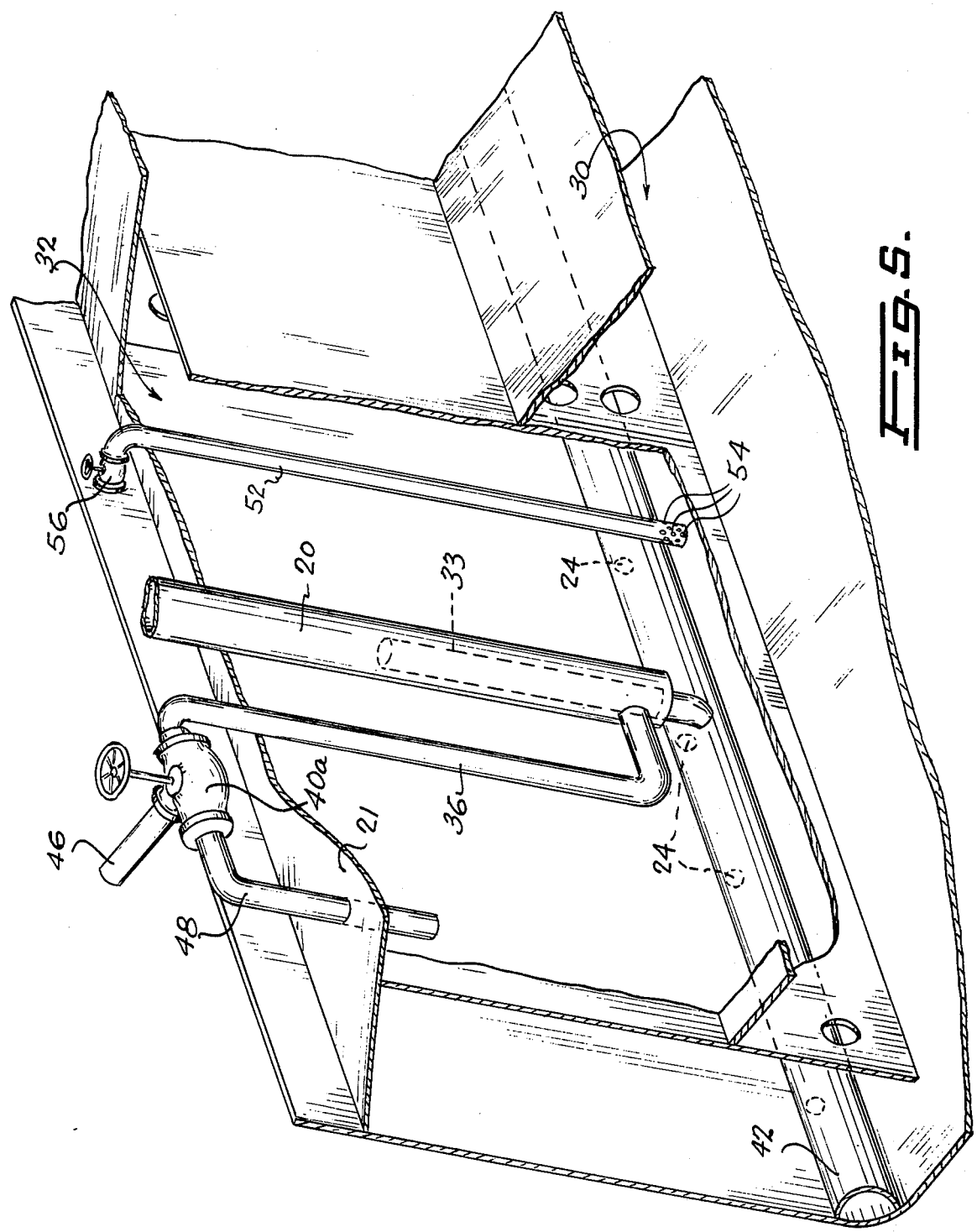

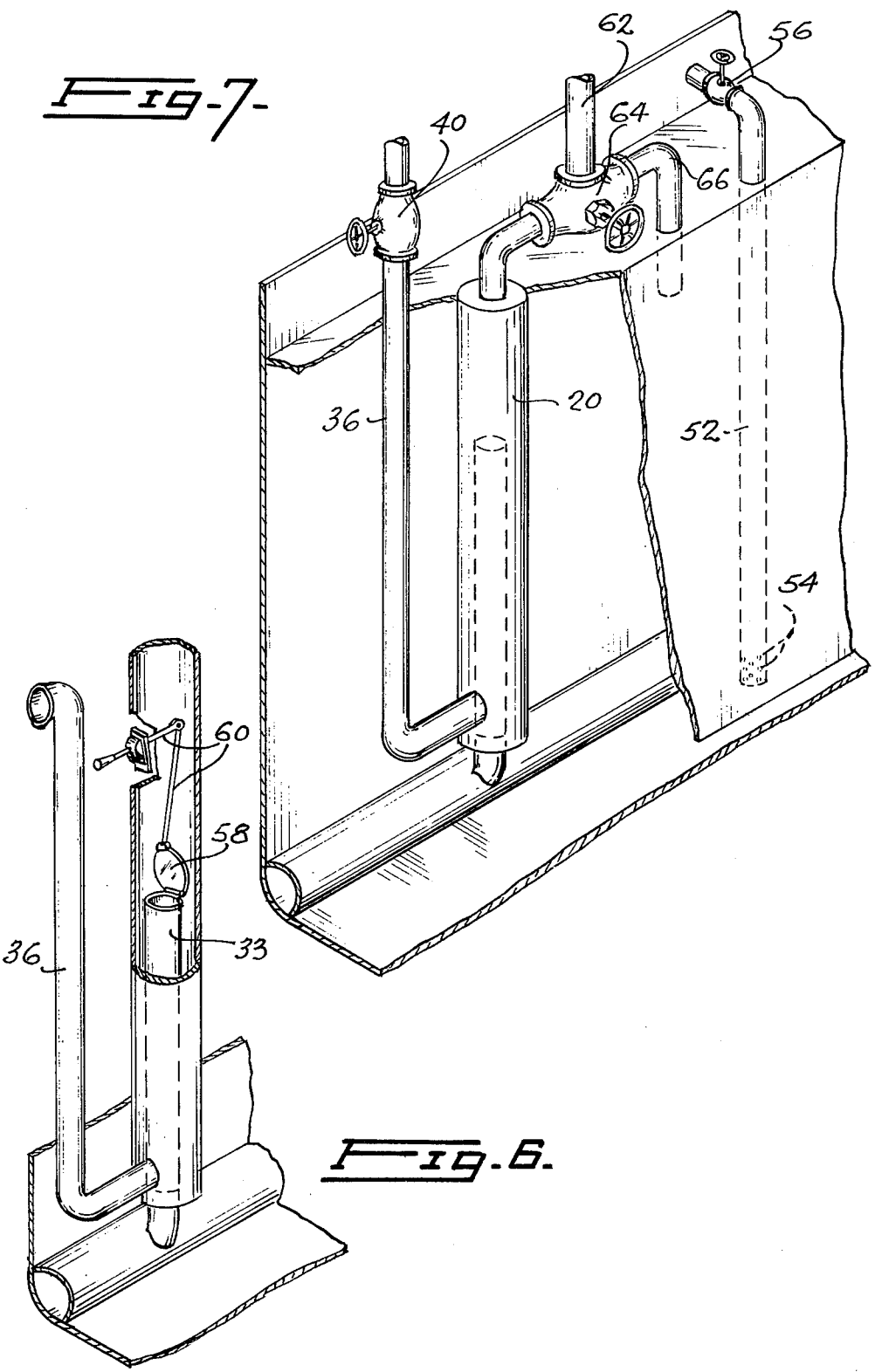

SHIP'S HULL AND METHOD OF BUBBLING HOT GAS THEREFROM

This invention relates to the generation of compressed gas for bubbling from ships' hulls in ice-laden waters in order to reduce the drag on the ships movement produced by the ice and also to help break up the ice. The invention also relates to the use of compressed gas in ships in applications in addition to bubbling.

It is known in the prior art that bubbling a gas from a ship's hull below the water line in ice-laden waters helps to reduce friction and to break up the ice. As examples, Canadian Pat. No. 889,081 issued Dec. 28, 1971 and granted to Oy Wartsila Ab, of Helsinki, Finland and Canadian Pat. No. 889,640 issued Jan. 4, 1972 and granted to the inventor of the present invention are referred to.

As far as is known, compressed air has been the only gas suggested for this use but it has now been proposed by the inventor of the present invention that a similar effect is obtainable with gases other than compressed air provided the gas bubbles do not dissolve or collapse appreciably during their passage through the sea water.

The conventional method of compressing air for bubbling purposes has been by the use of a diesel engine which is used to drive a conventional air compressor. This method has several disadvantages in that the necessary machinery is very heavy and bulky, and it has been necessary to devote a considerable amount of space to such machinery.

In an attempt to develop a method of generating compressed gas using smaller and lighter equipment, the inventor of the present invention considered the use of a gas turbine instead of a diesel engine to drive the air compressor. However, gas turbine engines tend to be less efficient in this application than diesel engines of a similar size.

A further disadvantage of the conventional gas-bubbling arrangement is that the tubes supplying compressed air to holes in a ship's hull located below the water line contain water when the bubbling equipment is not being used and the water in the pipes may freeze making use of the bubbling apparatus impossible when required. A way of avoiding this would be to provide valves adjacent the outlet holes to prevent water entering the pipes, but in ice-capable or dual purpose ships the internal surface of the hull is usually surrounded either by the cargo, such as crude oil, or by ballast-water which is used to flood the ballast compartments of the ship when a cargo is not being carried, so access to such valves would be difficult.

It is an object of the present invention to provide a process of generating a compressed gas suitable for bubbling from a ships' hull by a more effective means than that conventionally used.

It is another object of the invention to make use of the compressed gas for purposes in addition to bubbling.

According to one aspect of the invention there is provided in a ship's hull, apparatus for generating and supplying compressed gas to at least one hole located in the hull below the ship's waterline to produce gas-bubbling from the hull for the purpose of assisting ice-breaking in ice-laden waters, which apparatus comprises: (a) air compression means; (b) mixing means for mixing fuel with the compressed air; (c) ignition means for igniting the fuel/air mixture to generate hot gas under pressure; and (d) pipe means receiving hot gas from said mixing means and for supplying said gas to said hole in the hull at a pressure in excess of the external water pressure at said holes.

According to another aspect of the invention there is provided a method of generating and supplyng compressed gas to at least one hole located in a ship's hull below the water line to produce gas-bubbling from the hull for the purpose of assisting ice-breaking in ice-laden waters, which method comprises: (a) compressing air; (b) mixing said compressed air with fuel; (c) igniting said fuel/air mixture to generate gas at a pressure greater than the water pressure outside said hull at the depth of said hole; and (d) supplying said compressed gas to said hole without allowing the pressure thereof to fall below said external water pressure.

Preferred embodiments of the invention are described in the following with reference to the attached drawings, in which:

FIG. 5 is a perspective view of a portion of a ship's hull viewed from the interior with various parts cut away to show the gas-bubbling apparatus more clearly;

FIG. 6 is a perspective view of a modified portion of the apparatus shown in FIG. 5;

FIG. 7 is a view similar to that of FIG. 5 showing an alternative arrangement;

Figure 1:
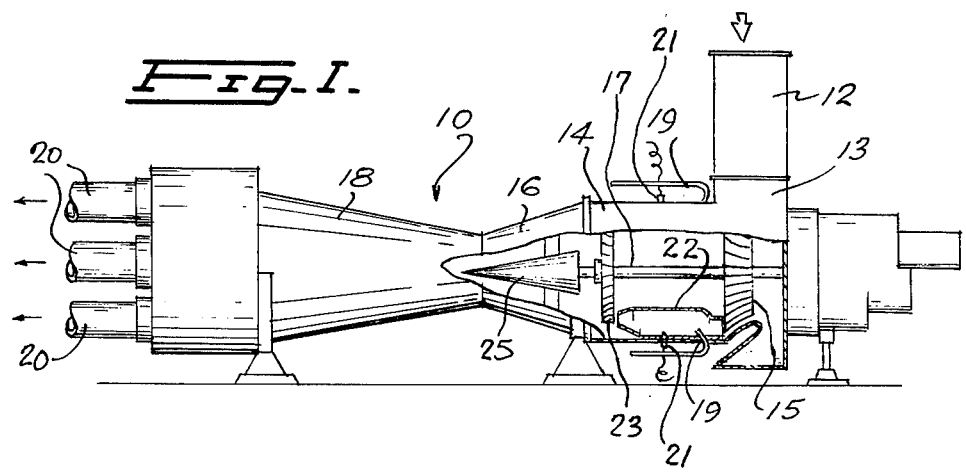
FIG. 1 is a simplified elevational view of a modified gas turbine engine, with a portion of the outer casing cut away to reveal internal parts which modified engine can be used for the generation of hot, compressed gas.

A modified gas turbine engine adapted to operate as a gas generator is shown generally at 10 in FIG. 1. The generator 10 consists of an air inlet 12 to a compressor section 13 containing a rotor 15 which is mounted on a shaft 17 and keyed for rotation with the shaft; a gas generator section 14 containing combustion chambers, such as the one shown at 22, and a further rotor 23 which is also keyed for rotation with the shaft 17, the combustion chambers being arranged in a circle about the inner periphery of the gas generator section 14 and each having an inlet and an outlet as shown, a fuel mixing device 19 and an ignition device 21; a nozzle 16 containing a conical baffle 25; a diffuser 18 and gas delivery pipes 20.

Air is drawn into the gas generator 10 through the air inlet 12 and is compressed by the rotor 15 and passed to the gas generator section 14 where it is mixed with fuel in the combustion chamber 22 and ignited by devices 19 and 21 respectively. The resulting exhaust gases impinge upon rotor 23 which is thereby rotated and consequently drives the compression rotor 15 via shaft 17, and then the gases are directed by the nozzle 16 into the gas diffuser 18 and from there the exhaust gases enter the gas delivery pipes 20 which deliver the gas to the required location in the ship. The rotor 23 is designed so that the compression rotor 15 is driven at a sufficient speed for suitable air compression without unnecessary restriction on the flow of gas from section 14.

It should be appreciated that the gas generator in FIG. 1 differs from a conventional gas turbine engine in that the usual power rotor has been removed. Conventionally, the exhaust gases from the gas generator section 14 are directed onto a turbine rotor in order to produce rotational torque which is then used to drive machinery in a conventional manner. In substituting a gas turbine engine for a diesel engine used for driving an air compressor for bubbling purposes it would be usual therefore to use the rotational torque produced by the gas turbine engine to drive the compressor. However, one aspect of the present invention is based on the realization that both the power turbine rotor and the compressor apparatus can be obviated by modifying the gas turbine in the manner described, so that the combustion gases generated in the gas generator section 14 are used directly as the compressed gas to be bubbled from the holes in the ship's hull located below the water line.

Successful use of such compressed gas is only possible if the gas pressure is sufficient to overcome the water pressure at the depth of the holes in the ships' hull. For example, in sea water at 4° C the expected water pressure adjacent holes located 35 feet below the surface is approximately 30 pounds per square inch (absolute) whereas it has been found that gas turbine engines modified in the manner described, but without the diffuser 18 can generate gas at a pressure of at least 35 pounds per square inch (absolute).

Indeed, much greater pressures can be obtained by the use of the diffuser 18 which acts as an expansion chamber inside which the gases from the nozzle 16 are slowed down and increased in pressure. In effect, the high speed of the gases emitted from the nozzle 16 is effective to increase the pressure of the gases inside the enlarged space of the diffuser 18. In this way, a gas pressure increase of 2 or more times is theoretically possible. Thus, gas at a sufficient pressure for use in bubbling applications can be generated by simple apparatus which does not require the use of a conventional gas compressor of the type driven by a diesel or similar engine and is therefore significantly simplified and reduced in size. In addition, it is found that a gas turbine engine modified in the manner described and used in this application is as efficient as or more efficient than a conventional diesel engine and gas compressor combination, but is considerably less heavy and takes up less valuable space.

An additional and very important advantage of the use of the gas generator described above is that the compressed gas thus generated is hot. It is estimated that the combustion gases leaving the nozzle 16 are at a temperature of approximately 1,250° F. and the beneficial consequences of this are apparent from the following description.

Firstly, the use of hot, compressed gas instead of compressed gas at substantially ambient temperatures for bubbling from a ship's hull produces a greater volume of bubble forming gases for an equivalent mass of compressed gas which will increase the effect of the friction reducing bubbles and hence increase ice-breaking efficiency. Additionally, formation of bubbles containing gases at the described high temperatures will cause generation of steam at the gas-to-water surface within the bubble sphere, thus further increasing bubble volume and, hence, their effect. Secondly, the heat from the gas can be used for other purposes in the ship, as will become apparent from the following.

Figure 2:
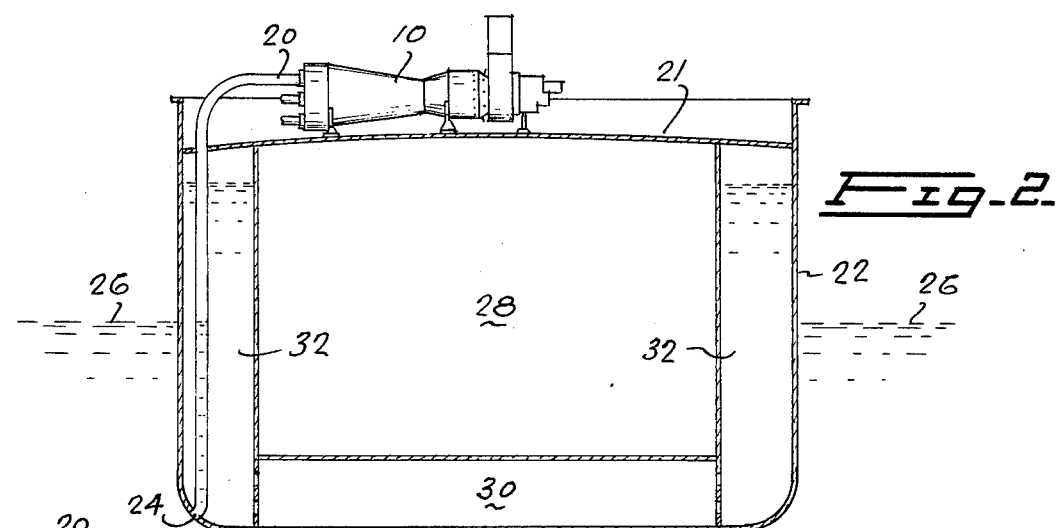
FIG. 2 is a transverse cross-sectional view of a cargo ship taken roughly amidships showing gas-bubbling equipment installed therein. It should be realized that such a cargo ship contains much apparatus in addition to that shown but such additional apparatus has been omitted because it is unnecessary for an understanding of the present invention.

In FIG. 2 the gas generator 10 of FIG. 1 is shown installed on the deck plate 21 of the ship 22 with the gas delivery pipes 20 connected to holes 24 located in the ship's hull below the water line 26. Only one hole 24 is shown in FIG. 2, but preferably the holes are located at regular intervals along the entire length of the ship from stem to stern on both sides or, if economy is required, on selected lengths on both sides.

Figure 3:
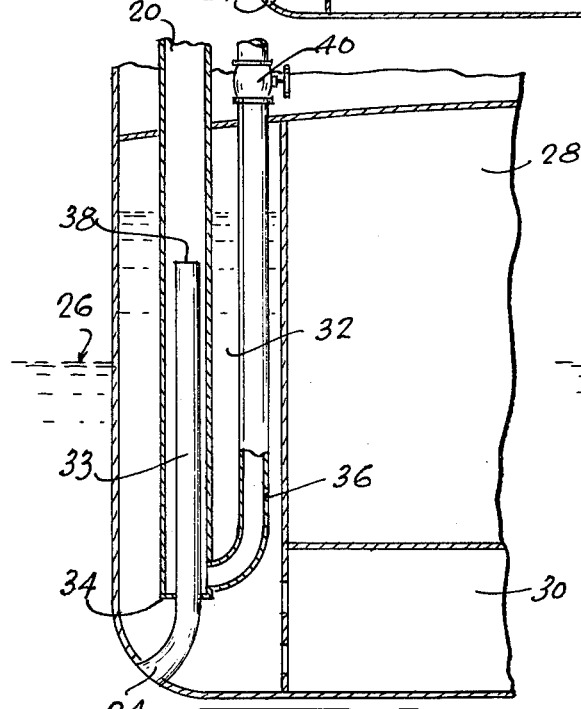
FIG. 3 is a transverse cross-sectional view of an enlarged scale of a lower portion of a cargo ship as shown in FIG. 2, illustrating piping forming part of the gas-bubbling equipment.

The apparatus as shown is not in use and as a consequence sea water has entered the lower portion of the gas delivery pipe 20 so that the level of water in the pipe is the same as the outside water level 26. As previously mentioned, it is possible for a portion of all of such water in the pipe 20 to freeze, in which case the gas-bubbling apparatus is not available for use when required. This danger can be avoided by the use of the apparatus shown in FIG. 3. For a complete understanding of this embodiment of the invention, it is pointed out that the cargo ship illustrated in FIG. 2 and FIG. 3 is divided into a cargo-holding compartment 28, a lower ballast compartment 30 and two side ballast compartments 32. The purpose of the ballast compartments is to contain sea water, or the like, when the cargo-holding compartment 28 is empty. Thus, when cargo has been removed from the compartment 28 the ballast compartments are flooded so that the vessel maintains a proper ice-breaking draft and has increased mass which is useful for ice-breaking purposes.

In FIG. 3 the gas delivery pipe 20 at its lower end surrounds a further gas delivery pipe 33 which is connected to hole 24 in the ship's hull. The end of pipe 20 is blocked at 34 as shown to form an airtight seal, and a further pipe 36 is connected to and communicates with pipe 20 adjacent the blocked end 34. Pipe 33 is of sufficient length for the end 38 to lie well above the water line 26 so that any water entering pipe 33 remains within that pipe and does not enter pipe 20. In assessing the length of pipe 33 it should be remembered that the water line 26 will vary according to the weight of cargo and/or ballast and the density of the sea water. By "water line", therefore, we mean the range between the highest and lowest levels of water that are to be expected in operation of the ship. One allowance should also be made for rough seas in assessing the correct length of pipe 33.

The water in pipe 33 which enters through hole 24 when the gas-bubbling equipment is not in use may freeze because of heat loss to the air in the side ballast compartment 32, which may be below freezing point because of heat loss to the atmosphere through deck plate 21 and the above-water areas of side plates 22. Should the water in pipe 33 freeze, valve 40 can be opened to allow the hot, compressed gas to flow around the outside of pipe 33 and through pipe 36, thus melting any ice in pipe 33 even in the bottom portion below the end 34 by conduction of heat along the metal of pipe 33. When the ice block in pipe 33 has melted, the valve 40 is closed and pressure in pipes 20 and 33 builds up until the melted ice is driven out of the pipe 33 and gas bubbles commence to escape from the hole 24.

Figure 4:
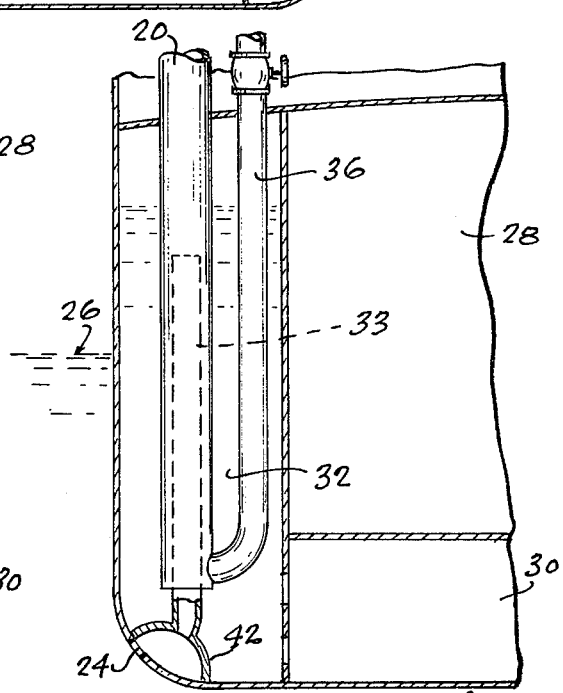
FIG. 4 is a view similar to that of FIG. 3 showing a modification of the piping.

FIG. 4 shows a similar view to that of FIG. 3 except that a manifold 42 in the form of a channel member is provided at the lower end of pipe 33. The manifold runs along the entire length of the ship which is to be subjected to bubble action. The manifold 42 forms part of the hull's structure and is thus constructed to the strength and watertightness requirements of the remainder of the hull. Holes 24 are formed at intervals along the length of the manifold 42 to allow the gas bubbles to escape at regularly spaced locations. Sea water in manifold 42 will always be at sea ambient temperature or above and thus will not become obstructed by ice. The manifold arrangement will also facilitate design and construction of the unheated section of pipe 33, making this section as short as possible. The main advantage of the manifold 42, however, is that fewer gas delivery pipes 20 are needed because in the apparatus of FIG. 3 a gas delivery pipe is required for each hole 24.

FIG. 5 illustrates a method of preventing sea water in the ballast tanks 30 and 32 from freezing. This is achieved by heating the ballast-water (not shown in FIG. 5 for simplicity) by means of heat transferred from pipes 20 and 36.

Valve 40 is replaced by a three position valve 40a which can vent hot gases to the atmosphere through pipe 46, can prevent the flow of gases through pipe 36 by closing this pipe for the purpose previously described, or can direct the gases into the ballast compartment 32 through pipe 48 for the purpose shortly to be described. Thus, when the hot gases are vented to the atmosphere through pipe 46 heating of the ballast tank water by pipes 20 and 36 is achieved as well as melting of the ice in the pipe 33. Pipe 36 need not be vertical as shown and it can be constructed in such a manner that maximum heat transfer from the hot gases within the pipe to the sea water surrounding the pipe is achieved. For example, the external surface of the pipe 36 can be formed with heat-transfer fins and can be made to extend for a considerable distance within the ballast tank 32 before passing through the deck plate 21. The only limitation on the length of the section of the pipe 36 within the ballast tank 32 is that when the gas temperature in the furthermost section of the pipe 36 within the ballast tank 32 equals that of the surrounding ballast-water, no further heating is achieved, so for economy in piping and space, the pipe 36 should pass through the deck plate 21 at some time before this temperature equalization is likely to take place.

When pipe 36 is blocked at valve 40a, the hot gases from pipe 20 pass through the pipe 33 and holes 24 in the hull, i.e. bubbling takes place, and substantially no heat is transferred from the pipe 36 to the ballast-water although some heat is transferred from pipe 20. Where, however, sufficient volumes of hot gases are generated, heating of ballast-water by pipe 36 and bubbling from the hull can be carried out simultaneously by partially restricting the vent opening of the valve 40a so that gas pressure in pipe 20 is sufficient to overcome water pressure at the holes 24 even though hot gases continue to flow through pipe 36 and thus effect ballast-water heating.

The possibility of freezing of the ballast-water in ships of the above described type is quite high, especially when cargo is being embarked in climates where the outside air temperature is very cold, since the opening of hatch covers will subject the ballast-water to high rates of heat loss into the hold compartment 28 of the ship. Further, the cargo is often at, or nearly at, ambient outside air temperatures and when placed in the hold will greatly increase the ballast-water heat loss. In the absence, therefore, of ballast-water heating as previously described, it is usually necessary to void the ballast tanks before embarking cargo, but, when the ballast-water is heated, simultaneous voiding of the ballast tanks and embarking of cargo can take place without the hazard of freezing and without altering the vessel draft. The ballast-water in the ballast compartments 32 and 30 can be discharged by utilization of the hot gas generated as described above.

In FIG. 5, pipe 48 passes through deck plate 21 and into ballast compartment 32. Thus, when valve 40a is adjusted to direct hot gases through the pipe 48, pressure builds up in the ballast compartments and the ballast-water may be forced through pipe 52, entering at the bottom through holes 54, and thus through the side of the ship, provided stop valve 56 is in the open position. Discharge of ballast-water will not occur unless sufficient overpressure is present in the ballast compartments to raise the column of water in pipe 52 to the height of the valve 56. To achieve this, unless bubbling is prevented at the time of discharge of ballast-water, the amount of compressed gas available must be quite high. Therefore, to avoid increasing the gas-generating capacity of the generator equipment, it is necessary to stop the bubbling of gas through holes 24 when discharge of ballast-water is required. This can be achieved as shown in FIG. 6 by locating a flap valve 58 at the top of pipe 33, linkage 60 being provided to enable the valve to be closed when required. There is usually no disadvantage in terminating the bubbling function during discharge of ballast-water because the vessel is usually located at a dock side when this takes place and ice-breaking is unnecessary. The closure of valve 58 means that the pressure generated by the gas-generating equipment can be used solely for voiding the ballast compartments.

In FIG. 7 an alternative arrangement for achieving the same result, namely the termination of the bubbling function during discharge of ballast-water, is illustrated. Compressed gas is delivered through pipe 62 to a two position valve 64 which either directs the gas to the bubbling equipment through pipe 20 or to the ballast tanks through pipe 66. When bubbling and/or heating the ballast-water, valve 64 is positioned to direct gas into the pipe 20, and when discharging ballast-water, the valve 64 is positioned to direct the gas into the ballast tank top through pipe 66. Thus, bubbling and discharging of ballast-water cannot be carried out simultaneously and full gas pressure is utilized for either purpose.

Figure 8:
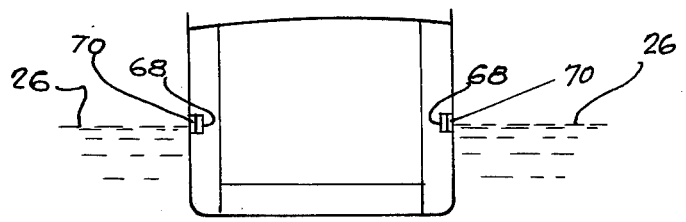
FIG. 8 is a simplified view similar to that of of FIG. 2 showing equipment used for heating the hull of a ship adjacent the water line.

Friction at the ice to ship interface can be further reduced by heating the hull plating adjacent the water line so that the contacting ice surface is melted, thus forming a lubricating water film between the ice and the ship. FIG. 8 shows the location of heating ducts 68 and 70 adjacent the water line 26 in order to achieve such a reduction in friction. The heating of the hull also serves to remove ice adhering to the hull in areas immediately above the water line. Such ice causes no drag when the vessel is moving through calm seas when the ice is above the water line, but drag is created when the vessel passes through any waves.

Figure 9:
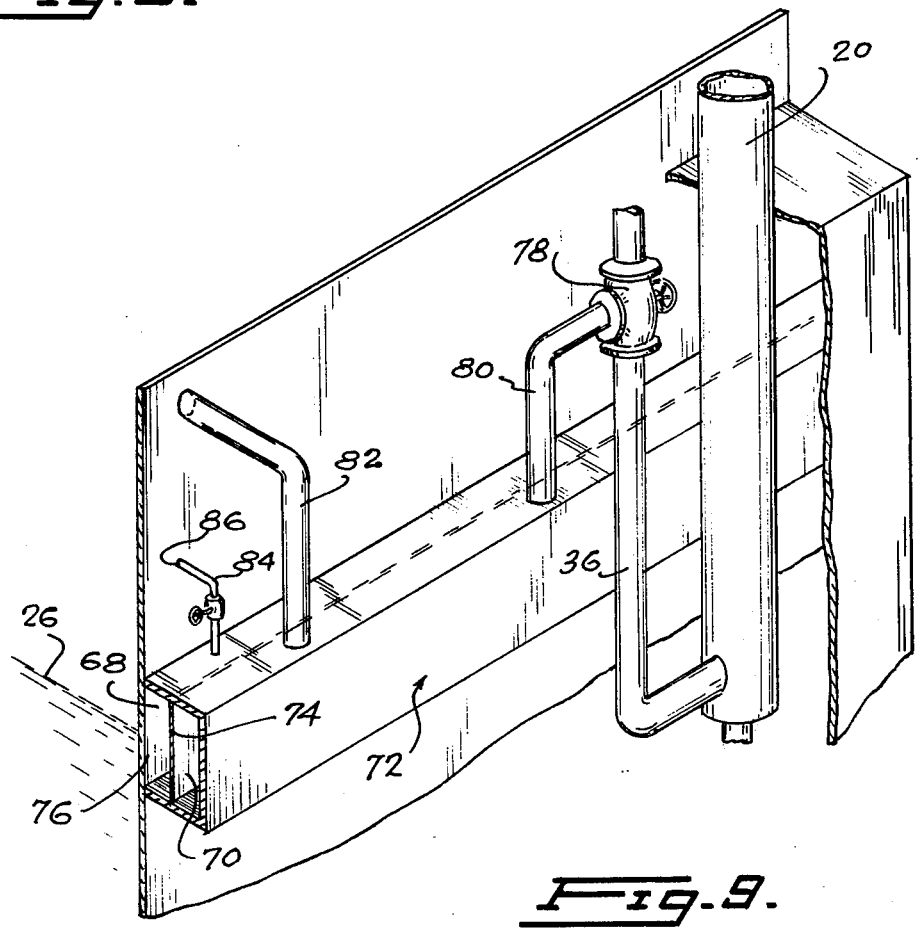
FIG. 9 is a perspective view of part of a ship's hull viewed from the interior with parts cut away to show more clearly the apparatus shown in simplified form in FIG. 8.

The heating arrangement of FIG. 8 is shown in more detail in FIG. 9. Manifold 72, which contains ducts 68 and 70, may be provided at each side of the ship along the entire length, or may be provided at selected areas only. Duct 68 contains sea water and duct 70 contains hot, compressed gas from generating equipment such as that previously described, and heat from the gas in the duct 70 passes through the wall 74 and raises the temperature of the sea water in the duct 68 which in turn heats the hull plates 76 adjacent the water line 26.

The hot, compressed gas is obtained from pipe 36 (which is more clearly and fully shown in FIG. 5) by providing a two position, intermediate valve 78 which directs the gas from pipe 36 through pipe 80 and thence into duct 70. The gas travels along duct 70 until its heating ability is spent and is then vented to the atmosphere through pipes such as the one shown at 82.

Manifold 72 is insulated along the top, bottom and inboard walls to prevent unnecessary heat losses. Pipes such as that shown at 84 are provided at points along the length of the duct 68 in order to allow hot water from the duct to be pumped outside the hull of the ship through holes 86 which are located above the water line so that hot water may be poured onto the surrounding ice surface thus providing a means of rapidly melting ice or creating a water lubrication film thereon.

It should be mentioned that the invention is equally applicable to any type of sea vessel and not merely to the compartment type vessel illustrated in the drawings.

It will be appreciated that in the invention advantages are achieved by the efficient generation of hot gas for bubbling from a ship's hull and the use of the hot gas for purposes in addition to bubbling. For most of these additional purposes it is necessary for the compressed gas to be hot so that conventional compressed gas-generating equipment cannot be used unless the compressed gas thus produced is heated in a separate operation prior to use. This would require further equipment and expense and would not result in the efficient generation of hot, compressed gases, as in the present invention.

It should also be appreciated that the hot gas needed to heat pipes 33 and 36 in FIG. 3, the gas used for voiding the ballast-water as shown in FIGS. 5 and 7 and the hot gas used to heat the hull adjacent the water line as shown in FIG. 9 need not be the same gas as used for bubbling. Indeed, each of these gases could be generated separately, if required, either by means of a modified gas turbine engine as described, or by conventional compressing and, if necessary, gas heating apparatus.

I claim:

1. In a ship's hull, apparatus for generating and supplying compressed gas to at least one hole located in the hull below the ship's water line to produce gas bubbling from the hull for the purpose of assisting ice-breaking in ice-laden waters, which apparatus comprises:
   a. air compression means;
   b. mixing means for mixing fuel with the compressed air;
   c. ignition means for igniting the fuel/air mixture to generate hot gas under pressure; and
   d. pipe means receiving hot gas from said mixing means and for supplying said gas to said hole in the hull at a pressure in excess of the external water pressure at said hole, said pipe means comprising:
   e. a first pipe having a lower end communicating with said hole, and an upper end located above said water line;
   f. a second pipe surrounding a portion of said first pipe including the upper end thereof and having an inlet portion connected to receive said hot gas;
   g. a third pipe having an upper end, and a lower end communicating with a lower portion of the second pipe at a location below said water line, whereby said hot gas received in said second pipe can travel into said third pipe if the first pipe is closed by ice, while flowing around said second pipe to melt said ice; and
   h. means for closing the upper end of the third pipe to cause said hot gas to travel along said first pipe to said hole.

2. The combination according to claim 1 including a compartment in said hull for ballast-water; and wherein said third pipe is located in said compartment, whereby heat from the hot gas, when passing through said third pipe, is transferred to ballast-water in said compartment.

3. In a ship's hull, apparatus for generating and supplying compressed gas to at least one hole located in the hull below the ship's water line to produce gas-bubbling from the hull for the purpose of assisting ice-breaking in ice-laden waters, which apparatus comprises:
   a. air compression means;
   b. mixing means for mixing fuel with the compressed air;
   c. ignition means for igniting the fuel/air mixture to generate hot gas under pressure;
   d. pipe means receiving hot gas from said mixing means and for supplying said gas to said hole in the hull at a pressure in excess of the external water pressure at said hole;
   e. a compartment in said hull for ballast-water;
   f. said pipe means including an outlet portion communicating with said compartment; and
   g. outlet pipe means for water from said compartment, having a lower inlet portion communicating with said compartment near the bottom thereof and an upper outlet portion outside said hull above said water line for discharge of said water, whereby gas introduced into said compartment by said pipe means causes water in said compartment to rise up said outlet pipe means and discharge outside said hull.

4. In a ship's hull, apparatus for generating and supplying compressed gas to at least one hole located in the hull below the ship's water line to produce gas-bubbling from the hull for the purpose of assisting ice-breaking in ice-laden waters, which apparatus comprises:
   a. air compression means;
   b. mixing means for mixing fuel with the compressed air;
   c. ignition means for igniting the fuel/air mixture to generate hot gas under pressure;
   d. pipe means receiving hot gas from said mixing means and for supplying said gas to said hole in the hull at a pressure in excess of the external water pressure at said hole;
   e. conduit means contacting an inside surface of a wall of said hull at the water line;

f. vertical partition means in said conduit means dividing it into two compartments, a first for receiving liquid therein contacting said wall and a second spaced from said wall;

g. said pipe means having an outlet portion for delivery of said gas to said second compartment; and h. further pipe means, spaced along said conduit means from said outlet portion and connected to exhaust said gas from said second compartment, whereby hot gas flowing through said second compartment heats said liquid in said first compartment by conduction through said partition means, and said liquid in said first compartment, so heated, heats the hull wall at the water line.

5. In a ship's hull, apparatus for supplying compressed gas to at least one hole located in the hull below the ship's water line to produce gas bubbling from the hull for the purpose of assisting ice-breaking in ice-laden water, which apparatus comprises:

a. means for producing a hot gas at a pressure higher than the external water pressure at said hole;

b. a first pipe having a lower end communicating with said hole, and an upper end located above said water line;

c. a second pipe surrounding a portion of said first pipe including the upper end thereof and having an inlet portion connected to receive said hot, compressed gas from said producing means;

d. a third pipe having an upper end, and a lower end communicating with a lower portion of the second pipe at a location below said water line, whereby said hot gas received in said second pipe can travel into said third pipe if the first pipe is closed by ice, while flowing around said second pipe to melt said ice;

e. and means for closing the upper end of the third pipe to cause said hot gas to travel along said first pipe to said hole.

6. The combination according to claim 5 including a manifold located between said pipe means and a plurality of said holes, said manifold comprising a channel member with which said holes and said pipe means communicate, said channel member being otherwise gas- and water-tight.

7. The combination according to claim 5 including a compartment in said hull for ballast-water and wherein said third pipe is located in said compartment whereby heat from the hot gas, when passing through said third pipe, is transferred to ballast-water in said compartment.

8. In a ship's hull having a compartment for ballast-water, apparatus comprising:

a. at least one chamber having an inlet and an outlet;

b. means for continuously supplying air under pressure to said at least one chamber through said inlet;

c. mixing means for continuously mixing fuel with said compressed air introduced into said chamber;

d. ignition means for igniting said fuel/air mixture in said chamber to continuously generate hot gas under pressure;

e. pipe means having an inlet portion for receiving said hot gas from said chamber and an outlet portion communicating with said compartment;

f. outlet pipe means for ballast-water from said compartment, having a lower inlet portion communicating with said compartment near the bottom thereof and an upper outlet portion outside said hull above the water line of the ship for discharging said water, whereby gas introduced into said compartment by said pipe means causes water in said compartment to rise up said outlet pipe means and discharge outside the hull.

9. In combination, a ship's hull having sides and a plurality of small holes arranged in at least one row located well below the ship's water line and extending along said sides, and apparatus for generating and supplying hot compressed gas to said holes on a continuous basis at a gas pressure sufficient to produce continuous gas bubbling from said holes for the purpose of assisting in ice-breaking in ice-laden waters using the effect of said bubbles at the surface of the water, said apparatus comprising:

a. at least one chamber having an inlet and an outlet;

b. means for continuously supplying air under pressure to said at least one chamber through said inlet;

c. mixing means for continuously mixing fuel with said compressed air introduced into said chamber;

d. ignition means for igniting said fuel/air mixture in said chamber to continuously generate hot gas at a pressure at least as high as said pressure sufficient to produce gas bubbling; and e. pipe means for receiving said hot gas continuously issuing from said outlet of said at least one chamber and for supplying said gas directly to said holes in the hull whilst maintaining the pressure of said gas at least as high as said sufficient pressure at said holes.

10. The combination according to claim 9, including an expansion chamber located between said at least one chamber and said pipe means for receiving the hot gas from said outlet to reduce the velocity of the gas and to increase its pressure before the gas enters said pipe means.

11. The combination according to claim 9, including a manifold located between said pipe means and said plurality of holes, said manifold comprising a channel member with which said holes and said pipe means communicate, said channel member being otherwise gas- and water-tight.

12. In combination, a ship's hull having sides and a plurality of small holes arranged in at least one row located well below the ship's water line and extending along said sides, and apparatus for generating and supplying hot compressed gas to said holes on a continuous basis at a gas pressure sufficient to produce continuous gas bubbling from said holes for the purpose of assisting in ice-breaking in ice-laden waters using the effect of said bubbles at the surface of the water, said apparatus comprising:

a. a gas turbine engine having at least one combustion chamber having an inlet and an outlet, a compressor for continuously forcing air into said chamber through said inlet, mixing means for continuously mixing fuel with the air introduced into the chamber, ignition means for igniting the fuel/air mixture to continuously generate gas under pressure in said chamber, which gas issues continuously from said outlet, and a rotor mounted for rotation in the path of the gas issuing from said outlet for driving said compressor; and b. pipe means for receiving said hot gas issuing from said outlet and for directly supplying said gas to said holes in the hull whilst maintaining the pressure of said gas at least as high as the pressure sufficient to produce bubbling.

13. A method of continuously generating and supplying hot compressed gas to a plurality of small holes in the sides of a ship's hull arranged in at least one row extending along said sides well below the ship's water line, to produce continuous gas bubbling from said holes for the purpose of assisting in ice-breaking in ice-laden waters using the effect of said bubbles at the surface of the water, said method comprising:

a. continuously supplying air under pressure to a chamber having an inlet and an outlet, said air being introduced into said chamber through said inlet;

b. continuously mixing fuel with the compressed air introduced into said chamber;

c. igniting said fuel/air mixture in said chamber to continuously generate hot gas at a pressure at least as high as that required to produce gas bubbling at said holes; and d. introducing said compressed gas from said chamber into pipe means for supplying said gas directly to said holes in the hull whilst maintaining the pressure of said gas at least as high as said pressure required to produce bubbling.

* * * * *